(12) United States Patent
Deng et al.

(10) Patent No.: US 11,870,335 B2
(45) Date of Patent: Jan. 9, 2024

(54) WIRELESS POWER TRANSFER (WPT) SYSTEM REGULATION METHOD AND SYSTEM FOR IMPLEMENTING ZVS IN WIDE POWER RANGE

(71) Applicant: Beijing Institute of Technology, Beijing (CN)

(72) Inventors: Junjun Deng, Beijing (CN); Zhenpo Wang, Beijing (CN); Na Fu, Beijing (CN); Shuo Wang, Beijing (CN)

(73) Assignee: Beijing Institute of Technology, Beijing (CN)

( * ) Notice: Subject to any disclaimer, the term of this patent is extended or adjusted under 35 U.S.C. 154(b) by 67 days.

(21) Appl. No.: 17/910,683

(22) PCT Filed: Apr. 16, 2021

(86) PCT No.: PCT/CN2021/087797
§ 371 (c)(1),
(2) Date: Sep. 9, 2022

(87) PCT Pub. No.: WO2022/021949
PCT Pub. Date: Feb. 3, 2022

(65) Prior Publication Data
US 2023/0198374 A1    Jun. 22, 2023

(30) Foreign Application Priority Data

Jul. 27, 2020 (CN) .......................... 202010740602.6

(51) Int. Cl.
*H02M 1/08* (2006.01)
*H02J 50/12* (2016.01)
(Continued)

(52) U.S. Cl.
CPC ............. *H02M 1/083* (2013.01); *H02J 50/12* (2016.02); *H02M 1/0058* (2021.05); *H02M 3/33573* (2021.05); *H02J 2207/20* (2020.01)

(58) Field of Classification Search
CPC ............... H02M 1/083; H02M 1/0058; H02M 3/33573; H02J 50/12; H02J 2207/20
See application file for complete search history.

(56) References Cited

U.S. PATENT DOCUMENTS 10,266,060 B2 * 4/2019 Elshaer ................. B60L 53/122
11,190,042 B2 * 11/2021 Mao ........................ B60L 53/22
(Continued)

FOREIGN PATENT DOCUMENTS

| CN | 105826997 | 8/2016 |
| CN | 106533185 | 3/2017 |

(Continued)

*Primary Examiner* — Jared Fureman
*Assistant Examiner* — Michael J Warmflash
(74) *Attorney, Agent, or Firm* — Marcus C. Dawes

(57) ABSTRACT

A wireless power transfer (WPT) system regulation method and system for implementing zero voltage switching (ZVS) in a wide power range are provided. The method includes: determining, according to a topology structure of a WPT system and based on a linear state equation, a phase-shift angle boundary and a switching frequency boundary of an inverter that meet ZVS; fixing a switching frequency at a resonance frequency of the WPT system, and determining, in a phase-shift manner, a phase-shift range and a corresponding first voltage output range for implementing ZVS; determining a frequency variation range of a frequency modulation method; determining an optimal switching frequency based on corresponding switching frequencies and phase-shift angles that meet ZVS at different expected output voltages of the WPT system; determining a second voltage output range for implementing ZVS at the optimal (Continued)

switching frequency; and regulating the WPT system by using different regulation methods.

8 Claims, 3 Drawing Sheets

(51) Int. Cl.
  *H02M 3/335* (2006.01)
  *H02M 1/00* (2006.01)

(56) References Cited

U.S. PATENT DOCUMENTS

| | | | |
|---|---|---|---|
| 2017/0240056 A1* | 8/2017 | Elshaer | H02J 50/12 |
| 2018/0367051 A1 | 12/2018 | Agamy et al. | |
| 2021/0152013 A1* | 5/2021 | Mao | H02J 50/10 |

FOREIGN PATENT DOCUMENTS

| | | |
|---|---|---|
| CN | 109823206 | 5/2019 |
| CN | 110601543 | 12/2019 |
| CN | 111064368 | 4/2020 |
| CN | 111864915 | 10/2020 |

\* cited by examiner

WIRELESS POWER TRANSFER (WPT) SYSTEM REGULATION METHOD AND SYSTEM FOR IMPLEMENTING ZVS IN WIDE POWER RANGE

CROSS REFERENCE TO RELATED APPLICATION

This patent application claims the benefit and priority of Chinese Patent Application No. 202010740602.6, entitled "WIRELESS POWER TRANSFER (WPT) SYSTEM REGULATION METHOD AND SYSTEM FOR IMPLEMENTING ZVS IN WIDE POWER RANGE" filed on Jul. 27, 2020, the disclosure of which is incorporated by reference herein in its entirety as part of the present application.

TECHNICAL FIELD

The present disclosure relates to the field of wireless power transfer (WPT) system regulation, and in particular, to a WPT system regulation method and system for implementing zero voltage switching (ZVS) in a wide power range.

BACKGROUND ART

The wireless power transfer (WPT) technology has attracted more and more attention in recent years because of its convenience and safety, and is widely used in biomedical implants, consumer electronics, underwater loads, electric vehicles, and the like. In the WPT system, a power output range needs to be wide enough to satisfy different operating conditions. During power regulation, a ZVS operation is necessary to improve system efficiency and reduce electromagnetic interference. Therefore, the ZVS operation needs to be performed in the wide power range. In the WPT system, there are two main control strategies for a full-bridge inverter: frequency modulation and phase shift. In frequency modulation control, a switching frequency of the full-bridge inverter is regulated according to an output power. In phase shift control, the switching frequency of the inverter is fixed, and an output voltage or power is regulated by controlling a phase between a lead leg and a lag leg of the inverter. Given the limitation of an adjustable frequency range, the output voltage or the power range adjusted through frequency modulation control is limited and cannot achieve a wide range of power output. However, when phase shift control is used in the WPT system, the ZVS operation whose output power changes greatly cannot be implemented, resulting in the increase in switching loss of the inverter and the decrease in system efficiency.

SUMMARY

The present disclosure is intended to provide a WPT system regulation method and system for implementing ZVS in a wide power range, to implement a soft switching operation of an inverter during output in a wide power range of a WPT system.

To achieve the above objective, the present disclosure provides a WPT system regulation method for implementing ZVS in a wide power range, including:

determining, according to a topology structure of a WPT system and based on a linear state equation, a phase-shift angle boundary and a switching frequency boundary of an inverter that meet ZVS, where the WPT system is an LCC-LCC compensation topology structure;

fixing a switching frequency at a resonance frequency of the WPT system, and determining, in a phase-shift manner, a phase-shift range and a corresponding first voltage output range for implementing ZVS;

determining a frequency variation range of a frequency modulation method based on the resonance frequency of the WPT system;

determining an optimal switching frequency based on corresponding switching frequencies and phase-shift angles that meet ZVS at different expected output voltages of the WPT system;

determining, based on the phase-shift range for implementing ZVS, a second voltage output range for implementing ZVS at the optimal switching frequency; and regulating the WPT system by using different regulation methods according to a relationship between a reference voltage of the WPT system and the first voltage output range and a relationship between the reference voltage and the second voltage output range, where the regulation methods include a first regulation method, a second regulation method, and a third regulation method; the first regulation method includes: fixing the switching frequency at the resonance frequency of the WPT system, and regulating the WPT system by using a phase-shift method; the second regulation method includes: fixing a phase angle at a maximum phase angle in the phase-shift range for implementing ZVS, and regulating the WPT system by using a frequency modulation method; and the third regulation method includes: fixing the switching frequency at the optimal switching frequency, and regulating the WPT system by using a phase-shift method.

Optionally, the determining, according to a topology structure of a WPT system and based on a linear state equation, a phase-shift angle boundary and a switching frequency boundary of an inverter that meet ZVS specifically includes:

constructing a linear state equation, where the linear state equation is $\dot{x}(t)=Ax(t)+Bu(t)$, where $\dot{x}(t)$ is a derivative of a state quantity $x(t)$; $x(t)=[i_{Lf1}(t)\ u_{Cf1}(t)\ i_1(t)\ u_{C1}(t)]^T$, where $i_{Lf1}(t)$ is a current through an inductor in a primary-side resonance compensation network, $u_{Cf1}(t)$ is a voltage at both ends of a parallel capacitor in the primary-side resonance compensation network, $i_1(t)$ is a current through a self-inductor of a transmit coil, and $u_{C1}(t)$ is a voltage at both ends of a series capacitor in the primary-side resonance compensation network; A is a system matrix and $$A = \begin{bmatrix} 0 & -\dfrac{1}{L_{f1}} & 0 & 0 \\ \dfrac{1}{C_{f1}} & 0 & -\dfrac{1}{C_{f1}} & 0 \\ 0 & \dfrac{1}{L_1+L_{req}} & -\dfrac{\text{Re}(Z_{ref})}{L_1+L_{req}} & -\dfrac{1}{L_1+L_{req}} \\ 0 & 0 & \dfrac{1}{C_1} & 0 \end{bmatrix},$$

where $C_{f1}$ is the parallel capacitor in the primary-side resonance compensation network, $L_{f1}$ is the inductor in the primary-side resonance compensation network, $L_1$ is the self-inductor of the transmit coil, $L_{req}$ is an equivalent inductor, $C_1$ is the series capacitor in the primary-side resonance compensation network, $\text{Re}(Z_{ref})$ is a real part of an impedance $Z_{ref}$ mapped from a secondary side to a primary side, and $Re(Z_{ref})$ is related to a switching frequency; B is a control matrix and $$B = \begin{bmatrix} \dfrac{1}{L_{f1}} & 0 & 0 & 0 \end{bmatrix}^T;$$

and $u(\Delta)$ is an output voltage of a primary-side inverter, $u(\Delta_0)=U_{dc}$, $u(\Delta_1)=0$, $u(\Delta_2)=-U_{dc}$, and $u(\Delta_3)=0$, where $U_{dc}$ is a primary-side DC input voltage, $\Delta_0$ represents a time period $t_0 \sim t_1$, $\Delta_1$ represents a time period $t_1 \sim t_2$, $\Delta_2$ represents a time period $t_2 \sim t_3$, and $\Delta_3$ represents a time period $t_3 \sim t_4$, where $\Delta_0$, $\Delta_1$, $\Delta_2$, and $\Delta_3$ are related to phase-shift angles;

solving the linear state equation by using a numerical method and a formula $$\begin{bmatrix} -e^{A\Delta_0} & I & 0 & 0 \\ 0 & -e^{A\Delta_1} & I & 0 \\ 0 & 0 & -e^{A\Delta_2} & I \\ I & 0 & 0 & -e^{A\Delta_3} \end{bmatrix} \begin{bmatrix} x(t_0) \\ x(t_1) \\ x(t_2) \\ x(t_3) \end{bmatrix} = \begin{bmatrix} A^{-1}(e^{A\Delta_0}-I)BU_{dc} \\ 0 \\ -A^{-1}(e^{A\Delta_2}-I)BU_{dc} \\ 0 \end{bmatrix}$$

according to a symmetry of waveforms of an output voltage and an output current of an inverter in a steady state, to obtain a state quantity at each switching moment, where the switching moments include a moment $t_0$, a moment $t_1$, a moment $t_2$, and a moment $t_3$, where $x(t_0)$ is a state quantity at the moment $t_0$, $x(t_1)$ is a state quantity at the moment $t_1$, $x(t_2)$ is a state quantity at the moment $t_2$, and $x(t_3)$ is a state quantity at the moment $t_3$; and determining a phase-shift angle boundary and a switching frequency boundary of an inverter according to a condition for meeting ZVS, where the condition for meeting ZVS is $$\begin{cases} i_{Lf1}(t_0) < 0 \\ i_{Lf1}(t_1) > 0 \\ i_{Lf1}(t_2) > 0 \\ i_{Lf1}(t_3) < 0 \end{cases},$$

namely, $i_{Lf1\_min} = \min\{-i_{Lf1}(t_0), i_{Lf1}(t_1), i_{Lf1}(t_2), -i_{Lf1}(t_3)\} > 0$, where $i_{Lf1\_min}$ is a minimum absolute value of a current of the inductor in the primary-side resonance compensation network, $i_{Lf1}(t_0)$ is a current through the inductor in the primary-side resonance compensation network at the moment $t_0$, $i_{Lf1}(t_1)$ is a current through the inductor in the primary-side resonance compensation network at the moment $t_1$, $i_{Lf1}(t_2)$ is a current through the inductor in the primary-side resonance compensation network at the moment $t_2$, and $i_{Lf1}(t_3)$ is a current through the inductor in the primary-side resonance compensation network at the moment $t_3$.

Optionally, the determining a frequency variation range of a frequency modulation method based on the resonance frequency of the WPT system specifically includes:

plotting, in a resonance frequency range based on the resonance frequency of the WPT system, a curve of a system output voltage varying with a switching frequency; and determining a switching frequency band corresponding to a monotonously varying curved segment in the curve as the frequency variation range of the frequency modulation method.

Optionally, the determining an optimal switching frequency based on corresponding switching frequencies and phase-shift angles that meet ZVS at different expected output voltages of the WPT system specifically includes:

for each expected output voltage of the WPT system, calculating, by using a Kirchhoff's voltage law, a phase-shift angle corresponding to each frequency that meets the expected output voltage in the frequency variation range of the frequency modulation method;

determining a curve, corresponding to each expected output voltage, of the minimum absolute value that is of the current of the inductor in the primary-side resonance compensation network and that varies with a frequency; and determining an optimal switching frequency according to curves corresponding to all expected output voltages, where at the optimal switching frequency in all frequencies, a maximum quantity of minimum absolute values that are of the current of the inductor in the primary-side resonance compensation network and that are greater than 0 is obtained.

Optionally, the regulating the WPT system by using different regulation methods according to a relationship between a reference voltage of the WPT system and the first voltage output range and a relationship between the reference voltage and the second voltage output range specifically includes:

when the reference voltage of the WPT system is in a range $[U_p, U_{max}]$, regulating the WPT system by using the first regulation method;

when the reference voltage of the WPT system is in a range $[U_H, U_P]$, regulating the WPT system by using the second regulation method;

when the reference voltage of the WPT system is in a range $[U_L, U_H]$, regulating the WPT system by using the third regulation method; and when the reference voltage of the WPT system is in a range $(0, U_L)$ or $(U_{max}, \infty)$, regulating the WPT system by using the first regulation method, where the first voltage output range is $[U_p, U_{max}]$, and the second voltage output range is $[U_L, U_H]$.

The present disclosure further provides a WPT system regulation system for implementing ZVS in a wide power range, including:

a boundary determining module configured to determine, according to a topology structure of a WPT system and based on a linear state equation, a phase-shift angle boundary and a switching frequency boundary of an inverter that meet ZVS, where the WPT system is an LCC-LCC compensation topology structure;

a phase-shift range and first voltage output range determining module configured to fix a switching frequency at a resonance frequency of the WPT system, and determine, in a phase-shift manner, a phase-shift range and a corresponding first voltage output range for implementing ZVS;

a frequency variation range determining module configured to configured to determine a frequency variation range of a frequency modulation method based on the resonance frequency of the WPT system;

an optimal switching frequency determining module configured to configured to determine an optimal switching frequency based on corresponding switching frequencies and phase-shift angles that meet ZVS at different expected output voltages of the WPT system;

a second voltage output range determining module configured to determine, based on the phase-shift range for implementing ZVS, a second voltage output range for implementing ZVS at the optimal switching frequency; and a regulation module configured to regulate the WPT system by using different regulation methods according to a relationship between a reference voltage of the WPT system and the first voltage output range and a relationship between the reference voltage and the second voltage output range, where the regulation methods include a first regulation method, a second regulation method, and a third regulation method; the first regulation method includes: fixing the switching frequency at the resonance frequency of the WPT system, and regulating the WPT system by using a phase-shift method; the second regulation method includes: fixing a phase angle at a maximum phase angle in the phase-shift range for implementing ZVS, and regulating the WPT system by using a frequency modulation method; and the third regulation method includes: fixing the switching frequency at the optimal switching frequency, and regulating the WPT system by using a phase-shift method.

Optionally, the boundary determining module specifically includes:

a linear state equation construction unit configured to construct a linear state equation, where the linear state equation is $\dot{x}(t)=Ax(t)+Bu(t)$, where $\dot{x}(t)$ is a derivative of a state quantity $x(t)$; $x(t)=[i_{Lf1}(t)\ u_{Cf1}(t)\ i_1(t)\ u_{C1}(t)]^T$, where $i_{Lf1}(t)$ is a current through an inductor in a primary-side resonance compensation network, $u_{Cf1}(t)$ is a voltage at both ends of a parallel capacitor in the primary-side resonance compensation network, $i_1(t)$ is a current through a self-inductor of a transmit coil, and $u_{C1}(t)$ is a voltage at both ends of a series capacitor in the primary-side resonance compensation network; A is a system matrix and $$A = \begin{bmatrix} 0 & -\frac{1}{L_{f1}} & 0 & 0 \\ \frac{1}{C_{f1}} & 0 & -\frac{1}{C_{f1}} & 0 \\ 0 & \frac{1}{L_1+L_{req}} & -\frac{Re(Z_{ref})}{L_1+L_{req}} & -\frac{1}{L_1+L_{req}} \\ 0 & 0 & \frac{1}{C_1} & 0 \end{bmatrix},$$

where $C_{f1}$ is the parallel capacitor in the primary-side resonance compensation network, $L_{f1}$ is the inductor in the primary-side resonance compensation network, $L_1$ is the self-inductor of the transmit coil, $L_{req}$ is an equivalent inductor, $C_1$ is the series capacitor in the primary-side resonance compensation network, $Re(Z_{ref})$ is a real part of an impedance $Z_{ref}$ mapped from a secondary side to a primary side, and $Re(Z_{ref})$ is related to a switching frequency; B is a control matrix and $$B = \begin{bmatrix} \frac{1}{L_{f1}} & 0 & 0 & 0 \end{bmatrix}^T;$$

and $u(\Delta)$ is an output voltage of a primary-side inverter, $u(\Delta_0)=U_{dc}$, $u(\Delta_1)=0$, $u(\Delta_2)=-U_{dc}$, and $u(\Delta_3)=0$, where $U_{dc}$ is a primary-side DC input voltage, $\Delta_0$ represents a time period $t_0 \sim t_1$, $\Delta_1$ represents a time period $t_1 \sim t_2$, $\Delta_2$ represents a time period $t_2 \sim t_3$, and $\Delta_3$ represents a time period $t_3 \sim t_4$, where $\Delta_0$, $\Delta_1$, $\Delta_2$, and $\Delta_3$ are related to phase-shift angles;

a state quantity solving unit configured to solve the linear state equation by using a numerical method and a formula $$\begin{bmatrix} -e^{A\Delta_0} & I & 0 & 0 \\ 0 & -e^{A\Delta_1} & I & 0 \\ 0 & 0 & -e^{A\Delta_2} & I \\ I & 0 & 0 & -e^{A\Delta_3} \end{bmatrix} \begin{bmatrix} x(t_0) \\ x(t_1) \\ x(t_2) \\ x(t_3) \end{bmatrix} = \begin{bmatrix} A^{-1}(e^{A\Delta_0}-I)BU_{dc} \\ 0 \\ -A^{-1}(e^{A\Delta_2}-I)BU_{dc} \\ 0 \end{bmatrix}$$

according to a symmetry of waveforms of an output voltage and an output current of an inverter in a steady state, to obtain a state quantity at each switching moment, where the switching moments include a moment $t_0$, a moment $t_1$, a moment $t_2$, and a moment $t_3$, where $x(t_0)$ is a state quantity at the moment $t_0$, $x(t_1)$ is a state quantity at the moment $t_1$, $x(t_2)$ is a state quantity at the moment $t_2$, and $x(t_3)$ is a state quantity at the moment $t_3$; and a boundary determining unit configured to determine a phase-shift angle boundary and a switching frequency boundary of an inverter according to a condition for meeting ZVS, where the condition for meeting ZVS is $$\begin{cases} i_{Lf1}(t_0) < 0 \\ i_{Lf1}(t_1) > 0 \\ i_{Lf1}(t_2) > 0 \\ i_{Lf1}(t_3) < 0 \end{cases},$$

namely, $i_{Lf1\_min}=\min\{-i_{Lf1}(t_0), i_{Lf1}(t_1), i_{Lf1}(t_2), -i_{Lf1}(t_3)\}>0$, where $i_{Lf1\_min}$ is a minimum absolute value of a current of the inductor in the primary-side resonance compensation network, $i_{Lf1}(t_0)$ is a current through the inductor in the primary-side resonance compensation network at the moment $t_0$, $i_{Lf1}(t_1)$ is a current through the inductor in the primary-side resonance compensation network at the moment $t_1$, $i_{Lf1}(t_2)$ is a current through the inductor in the primary-side resonance compensation network at the moment $t_2$, and $i_{Lf1}(t_3)$ is a current through the inductor in the primary-side resonance compensation network at the moment $t_3$.

Optionally, the frequency variation range determining module specifically includes:

a first curve plotting unit configured to plot, in a resonance frequency range based on the resonance frequency of the WPT system, a curve of a system output voltage varying with a switching frequency; and a frequency variation range determining unit configured to determine a switching frequency band corresponding to a monotonously varying curved segment in the curve as the frequency variation range of the frequency modulation method.

Optionally, the optimal switching frequency determining module specifically includes:

a phase-shift angle calculation unit configured to: for each expected output voltage of the WPT system, calculate, by using a Kirchhoff's voltage law, a phase-shift angle corresponding to each frequency that meets the expected output voltage in the frequency variation range of the frequency modulation method;

a second curve plotting unit configured to determine a curve, corresponding to each expected output voltage, of the minimum absolute value that is of the current of the inductor in the primary-side resonance compensation network and that varies with a frequency; and an optimal switching frequency determining unit configured to determine an optimal switching frequency according to curves corresponding to all expected output voltages, where at the optimal switching frequency in all frequencies, a maximum quantity of minimum absolute values that are of the current of the inductor in the primary-side resonance compensation network and that are greater than 0 is obtained.

Optionally, the regulation module specifically includes:

a first regulation unit configured to: when the reference voltage of the WPT system is in a range $[U_p, U_{max}]$, regulate the WPT system by using the first regulation method;

a second regulation unit configured to: when the reference voltage of the WPT system is in a range $[U_H, U_P]$, regulate the WPT system by using the second regulation method; and a third regulation unit configured to: when the reference voltage of the WPT system is in a range $[U_L, U_H]$, regulate the WPT system by using the third regulation method, where the first regulation unit is further configured to: when the reference voltage of the WPT system is in a range $(0, U_L)$ or $(U_{max}, \infty)$, regulate the WPT system by using the first regulation method, where the first voltage output range is $[U_p, U_{max}]$, and the second voltage output range is $[U_L, U_H]$.

According to the specific embodiments provided by the present disclosure, the present disclosure discloses the following technical effects:

In the regulation method and system in the present disclosure, an output range in the system and a ZVS operating state of an inverter are comprehensively considered. Compared with conventional phase shift control, the present disclosure can implement a ZVS operation of the inverter at a lower output voltage, and through regulation, an output range in the present disclosure is wider than that in conventional frequency modulation control. Moreover, the present disclosure does not require additional auxiliary circuits or additional devices, the costs are low, and the losses caused by the additional devices are not increased. In addition, the control manner in the present disclosure is simple and easy to implement.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following descriptions show merely some embodiments of the present disclosure, and those of ordinary skill in the art may still derive other accompanying drawings from these accompanying drawings without creative efforts.

DETAILED DESCRIPTION OF THE EMBODIMENTS

The technical solutions in the embodiments of the present disclosure will be described below clearly and completely with reference to the accompanying drawings in the embodiments of the present disclosure. Apparently, the described embodiments are merely some rather than all of the embodiments of the present disclosure. All other examples obtained by a person of ordinary skill in the art based on the examples of the present disclosure without creative efforts shall fall within the protection scope of the present disclosure.

To make the above-mentioned objective, features, and advantages of the present disclosure clearer and more comprehensible, the present disclosure will be further described in detail below in conjunction with the accompanying drawings and specific embodiments.

Figure 1:
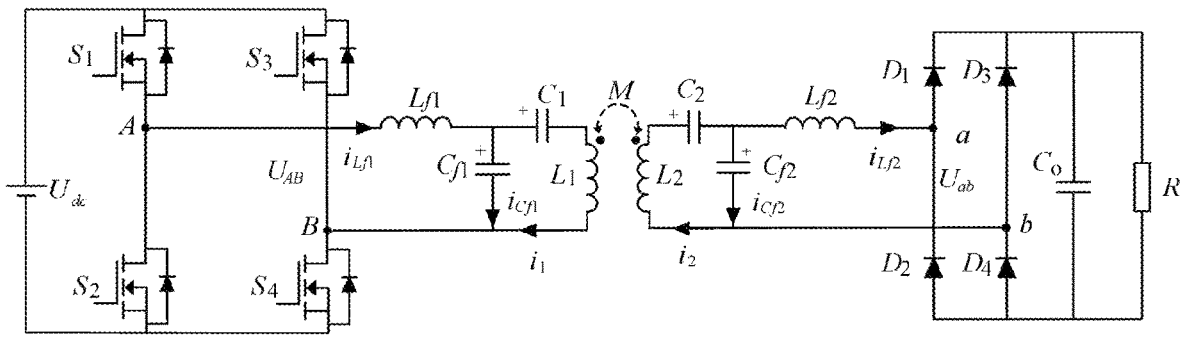
FIG. 1 is a circuit structural diagram of a WPT system according to the present disclosure.

A WPT system in the present disclosure is a WPT system based on an LCC-LCC compensation topology structure. As shown in FIG. 1, in FIG. 1, $S_1$ to $S_4$ is a primary-side MOSFET, and forms a primary-side full-bridge inverter. $D_1$ to $D_4$ is a secondary-side rectifier diode. $L_1$ and $L_2$ are respectively a self-inductor of a transmit coil and a self-inductor of a receive coil, M is a mutual inductor between the transmit coil and the receive coil, $L_{f1}$, $C_{f1}$, and $C_1$ are respectively an inductor, a parallel capacitor, and a series capacitor in a primary-side resonance compensation network, $L_{f2}$, $C_{f2}$, and $C_2$ are respectively an inductor, a parallel capacitor, and a series capacitor in a secondary-side resonance compensation network, $U_{dc}$ is a primary-side DC input voltage, $U_{AB}$ is an end voltage of two primary-side points A and B, $U_{ab}$ is an end voltage of two secondary-side points a and b, $i_1$, $i_2$, $i_{Lf1}$, and $i_{Lf2}$ are respectively currents through $L_1$, $L_2$, $L_{f1}$, and $L_{f2}$, $C_o$ is a filter capacitor, and R represents a load resistor.

Figure 2:
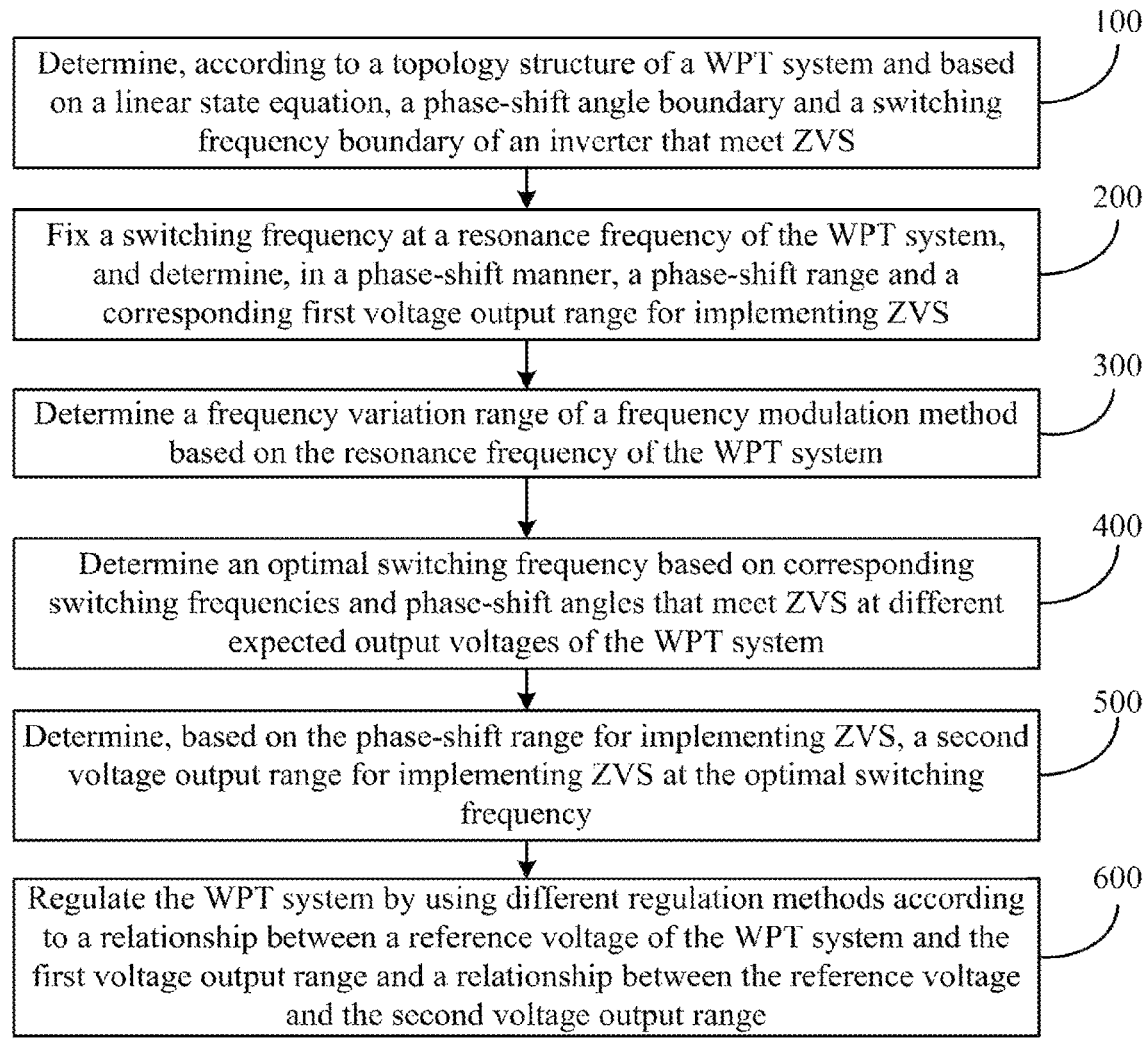
FIG. 2 is a schematic flowchart of a WPT system regulation method for implementing ZVS in a wide power range according to the present disclosure.

Based on the foregoing WPT system, FIG. 2 is a schematic flowchart of a WPT system regulation method for implementing ZVS in a wide power range according to the present disclosure. As shown in FIG. 2, the WPT system regulation method for implementing ZVS in a wide power range in the present disclosure includes the following steps.

Figure 3:
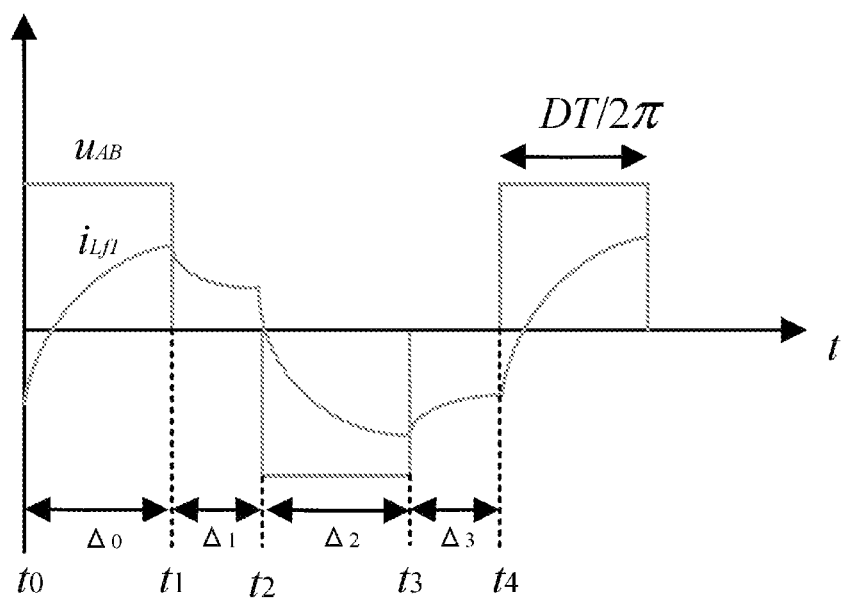
FIG. 3 is a waveform diagram of an output voltage and an output current of an inverter in a steady state according to the present disclosure.

Step 100: Determine, according to a topology structure of a WPT system and based on a linear state equation, a phase-shift angle boundary and a switching frequency boundary of an inverter that meet ZVS. In the WPT system in the present disclosure, in a control manner in which a phase-shift angle is D and a switching frequency is f, waveforms of an output voltage and an output current of a primary-side inverter in a steady state are shown in FIG. 3. In FIG. 3, T represents a switching period, and T=1/f. $\Delta_i$ represents a time interval from a moment $t_i$ to a moment $t_{i+1}$, and $\Delta_i = t_{i+1} - t_i$, where i=0,1,2,3, that is, $\Delta_0$ represents a time period $t_0 \sim t_1$, $\Delta_1$ represents a time period $t_1 \sim t_2$, $\Delta_2$ represents a time period $t_2 \sim t_3$, and $\Delta_3$ represents a time period $t_3 \sim t_4$, where $\Delta_0$, $\Delta_1$, $\Delta_2$, and $\Delta_3$ are related to phase-shift angles. Based on FIG. 3, the process of determining a phase-shift angle boundary and a switching frequency boundary of an inverter that meet ZVS is as follows:

A linear state equation is constructed. A set of piecewise linear state equations may be used for modeling, and values of $i_{Lf1}$, $u_{cf1}$, $i_1$, and $u_{c1}$ in each switching state in a single periodic waveform is solved by using a state space equation. The constructed linear state equation is $\dot{x}(t) = Ax(t) + Bu(t)$, $\dot{x}(t)$ is a derivative of a state quantity $x(t)$; $x(t) = [i_{Lf1}(t) \ u_{Cf1}(t) \ i_1(t) \ u_{C1}(t)]^T$, where $i_{Lf1}(t)$ is a current through an inductor in a primary-side resonance compensation network, $u_{Cf1}(t)$ is a voltage at both ends of a parallel capacitor in the primary-side resonance compensation network, $i_1(t)$ is a current through a self-inductor of a transmit coil, and $u_{C1}(t)$ is a voltage at both ends of a series capacitor in the primary-side resonance compensation network; A is a constant coefficient matrix of n×n and is referred to as a system matrix, n is a quantity of state variables, and n=4 in the present disclosure;

$$A = \begin{bmatrix} 0 & -\frac{1}{L_{f1}} & 0 & 0 \\ \frac{1}{C_{f1}} & 0 & -\frac{1}{C_{f1}} & 0 \\ 0 & \frac{1}{L_1+L_{req}} & -\frac{Re(Z_{ref})}{L_1+L_{req}} & -\frac{1}{L_1+L_{req}} \\ 0 & 0 & \frac{1}{C_1} & 0 \end{bmatrix},$$

where $L_{f1}$ is the parallel capacitor in the primary-side resonance compensation network, $L_{f1}$ is the inductor in the primary-side resonance compensation network, $L_1$ is the self-inductor of the transmit coil, $L_{req}$ is an equivalent inductor and whose calculation formula is $$L_{req} = \frac{Im(Z_{ref})}{\omega_s},$$

where $Im(Z_{ref})$ represents taking an imaginary part of an imaginary number $Z_{ref}$, $C_1$ is the series capacitor in the primary-side resonance compensation network, $Re(Z_{ref})$ represents taking a real part of an impedance $Z_{ref}$ mapped from a secondary side to a primary side, $Z_{ref}$ is an impedance that is mapped from the secondary side to the primary side and whose calculation formula is $$Z_{ref} = \frac{\omega_s^2 M^2}{Z_s},$$

where $\omega_s$ is a switching frequency, M is a mutual inductor, and $Z_s$ is an equivalent impedance at the secondary side, and $Re(Z_{ref})$ is related to the switching frequency; and B is a constant coefficient matrix of n×r, and is referred to as a control matrix. n is a quantity of state variables, r is a quantity of input variables. In the present disclosure, n=4, and r=1.

$$B = \begin{bmatrix} \frac{1}{L_{f1}} & 0 & 0 & 0 \end{bmatrix}^T,$$

where both A and B are determined based on parameters of the system.

It can be learned from the waveforms shown in FIG. 3 that there are different values of the output voltage u(Δ) of the primary-side inverter at different moments, $u(\Delta_0)=U_{dc}$, $u(\Delta_1)=0$, $u(\Delta_2)=-U_{dc}$, and $u(\Delta_3)=0$, where $U_{dc}$ is the primary-side DC input voltage.

A time domain solution of the foregoing linear state equation needs to be solved to obtain a value of $i_{Lf1}$ at each switching moment (switching moments include a moment $t_0$, a moment $t_1$, a moment $t_2$, and a moment) $t_3$. A numerical method may be used for solving, that is, $x(t_{k+1})=e^{A\Delta_k}x(t_k)+A^{-1}(e^{A\Delta_k}-I)Bu(\Delta_k)$. According to a symmetry of waveforms of an output voltage and an output current of an inverter in a steady state, $$\begin{bmatrix} -e^{A\Delta_0} & I & 0 & 0 \\ 0 & -e^{A\Delta_1} & I & 0 \\ 0 & 0 & -e^{A\Delta_2} & I \\ I & 0 & 0 & -e^{A\Delta_3} \end{bmatrix} \begin{bmatrix} x(t_0) \\ x(t_1) \\ x(t_2) \\ x(t_3) \end{bmatrix} = \begin{bmatrix} A^{-1}(e^{A\Delta_0}-I)BU_{dc} \\ 0 \\ -A^{-1}(e^{A\Delta_2}-I)BU_{dc} \\ 0 \end{bmatrix}$$

may be obtained through the solution process of the numerical method. According to this formula, the state quantity at each switching moment may be obtained, that is, $x(t_0)$, $x(t_1)$, $x(t_2)$, and $x(t_3)$, where $x(t_0)$ is a state quantity at the moment $t_0$, $x(t_1)$ is a state quantity at the moment $t_1$, $x(t_2)$ is a state quantity at the moment $t_2$, and $x(t_3)$ is a state quantity at the moment $t_3$. According to the state quantity at each switching moment, a current through the inductor in the primary-side resonance compensation network at each moment may be obtained, that is, $i_{Lf1}(t_0)$, $i_{Lf1}(t_1)$, $i_{Lf1}(t_2)$, and $i_{Lf1}(t_3)$, where $i_{Lf1}(t_0)$ is a current through the inductor in the primary-side resonance compensation network at the moment $t_0$, $i_{Lf1}(t_1)$ is a current through the inductor in the primary-side resonance compensation network at the moment $t_1$, $i_{Lf1}(t_2)$ is a current through the inductor in the primary-side resonance compensation network at the moment $t_2$, and $i_{Lf1}(t_3)$ is a current through the inductor in the primary-side resonance compensation network at the moment $t_3$.

The condition for meeting ZVS is $$\begin{cases} i_{Lf1}(t_0) < 0 \\ i_{Lf1}(t_1) > 0 \\ i_{Lf1}(t_2) > 0 \\ i_{Lf1}(t_3) < 0 \end{cases},$$

namely, $i_{Lf1\_min}=\min\{-i_{Lf1}(t_0), i_{Lf1}(t_1), i_{Lf1}(t_2), -i_{Lf1}(t_3)\}>0$, where $i_{Lf1\_min}$ is a minimum absolute value of a current of the inductor in the primary-side resonance compensation network. The phase-shift angle boundary (that is, a regulation range of a phase-shift angle) and the switching frequency boundary (that is, a regulation range of a switching frequency) of the inverter may be determined according to the condition for meeting ZVS.

Step 200: Fix a switching frequency at a resonance frequency of the WPT system, and determine, in a phase-shift manner, a phase-shift range and a corresponding first voltage output range for implementing ZVS. For the given WPT system, according to a parameter of each device in a circuit, the resonance frequency may be calculated by using a formula $$\omega_s = \frac{1}{\sqrt{L_{f1}C_{f1}}},$$

and therefore the resonance frequency is $$f_s = \frac{\omega_s}{2\pi}.$$

The switching frequency is fixed at the resonance frequency, that is, $f=f_s$, and the output voltage is regulated by changing a phase-shift angle, that is, the inverter is regulated in the phase-shift manner. When $f=f_s$, $i_{Lf1\_min}$ corresponding to different phase-shift angles D may be obtained. Generally, when $D=D_{max}$ ($D_{max}=\pi$), $i_{Lf1\_min}$ has the largest value and is greater than 0, and ZVS can be implemented in this case. As D decreases, the value of $i_{Lf1\_min}$ is smaller, and D=$D_p$, so that the value of $i_{Lf1\_min}$ is exactly 0. When D further decreases, the value of $i_{Lf1\_min}$ is less than 0, and ZVS cannot be implemented in this case. Therefore, the phase-shift range for implementing ZVS is $D_p$ to $D_{max}$. Because the output voltage increases with the increase of the phase-shift angle D, a corresponding voltage output range that can implement ZVS is $U_p$ to $U_{max}$, and is denoted as the first voltage output range.

Step 300: Determine a frequency variation range of a frequency modulation method based on the resonance frequency of the WPT system. Considering that a system reactive power is low and efficiency is high when the switching frequency is close to the resonance frequency, a frequency modulation range in the present disclosure is selected near the resonance frequency. When a phase angle is fixed, a relationship between a system output voltage and a switching frequency is not always monotonous. Therefore, a curve of the system output voltage varying with the switching frequency is plotted according to a system circuit parameter in a resonance frequency range, that is, near the resonance frequency, to determine a frequency range in which the system output voltage varies monotonically (monotonically increases or monotonically decreases) with the switching frequency in the curve. This range is the frequency variation range of the frequency modulation method in the present disclosure, and is denoted as $f_{min}$ to $f_{max}$.

Step 400: Determine an optimal switching frequency based on corresponding switching frequencies and phase-shift angles that meet ZVS at different expected output voltages of the WPT system. A specific process is as follows:

For each expected output voltage of the WPT system, because parameters of the system are determined, the frequency variation range of the frequency modulation method obtained in step 300 is within [$f_{min}$, $f_{max}$], a phase-shift angle corresponding to each frequency that meets the expected output voltage is calculated by using a Kirchhoff's voltage law. In this case, for each expected (output voltage, several input solutions may be obtained: $U_o = J(f_1, D_1) = J(f_2, D_2) = \ldots = J(f_n, D_n)$, where $f_{min} = f_1 < f_2 < \ldots < f_n = f_{max}$.

For each expected output voltage, the foregoing input solution may be substituted into a calculation expression of the ZVS boundary condition to obtain a minimum absolute value $i_{Lf1}\_min$ of a current of the inductor in the primary-side resonance compensation network corresponding to each switching frequency fin the case of the expected output voltage, so that the curve of $i_{Lf1}\_min$ corresponding to the expected output voltage varying with the switching frequency f can be obtained. The same operation is performed on an input solution corresponding to each expected output voltage, to obtain a curve of $i_{Lf1}\_min$ that is corresponding to each expected output voltage meeting ZVS and that varies with the switching frequency f.

The optimal switching frequency $f_{op}$ may be determined according to all curves. In all frequencies in the frequency variation range [$f_{min}$, $f_{max}$], a maximum quantity of $i_{Lf1}\_min$ greater than 0 at the optimal switching frequency is obtained, that is, a maximum quantity of expected output voltages that meet ZVS at the optimal switching frequency is obtained.

Step 500: Determine, based on the phase-shift range for implementing ZVS, a second voltage output range for implementing ZVS at the optimal switching frequency. When the switching frequency of the primary-side inverter is f=$f_{op}$, the output voltage is regulated by changing the phase angle, to satisfy $i_{Lf1\_min} > 0$ in a wide output voltage range as much as possible, that is, ZVS is implemented in the wide output voltage range as much as possible. When f=$f_{op}$, a voltage range for implementing ZVS can be denoted as $U_L$ to $U_H$, that is, the second voltage output range. The larger the-phase shift angle, the greater the value of $i_{Lf1\_min}$, the easier it is to implement ZVS. Therefore, the phase-shift angle corresponding to the voltage UH is D=$D_{max}$ and the switching frequency is f=$f_{op}$.

Step 600: Regulate the WPT system by using different regulation methods according to a relationship between a reference voltage of the WPT system and the first voltage output range and a relationship between the reference voltage and the second voltage output range. The regulation methods include a first regulation method, a second regulation method, and a third regulation method; the first regulation method includes: fixing the switching frequency at the resonance frequency of the WPT system, and regulating the WPT system by using a phase-shift method; the second regulation method includes: fixing a phase angle at a maximum phase angle in the phase -shift range for implementing ZVS, and regulating the WPT system by using a frequency modulation method; and the third regulation method includes: fixing the switching frequency at the optimal switching frequency, and regulating the WPT system by using a phase-shift method.

It can be learned from the foregoing derivation that when f=$f_s$, the voltage output range for implementing ZVS during phase angle regulation may be $U_p$ to $U_{max}$. Therefore, when the reference voltage of the WPT system is in a range [$U_p$, $U_{max}$], the WPT system is regulated by using the first regulation method, that is, f=$f_s$ and the phase angle regulation method are used.

When f=$f_{op}$, the voltage output range for implementing ZVS during phase angle regulation may be $U_L$ to $U_H$. Therefore, when the reference voltage of the WPT system is in a range [$U_L$, $U_H$], the WPT system is regulated by using the third regulation method, that is, f=$f_{op}$ and the phase angle regulation method are used.

Because the voltage output range for ZVS in a conventional phase-shift method is very limited, a value of $U_p$ is relatively large. However, when $f_{op}$ is excessively low, a value of $U_H$ may be relatively small when f=$f_{op}$ and the phase angle regulation method are used. Therefore, if only the foregoing two methods are used, there is a blank of the output voltage range $U_H$ to $U_p$. To resolve this problem, when the reference voltage of the WPT system is in the range [$U_H$, $U_P$], in the present disclosure, the WPT system is regulated by using the second regulation method, that is, D=$D_{max}$ and a frequency regulation method are used to fill in the blank of the output voltage range $U_H$ to $U_p$, and the frequency variation range is f∈($f_{min}$ to $f_{max}$). When the reference voltage of the WPT system is (0, $U_L$), because ZVS cannot be implemented by using f=$f_{op}$ and the phase angle regulation method, the WPT system is adjusted by using the first regulation method, that is, f=$f_s$ and the phase angle regulation method are used to reduce the system reactive power, thereby obtaining relatively high efficiency.

During implementation of the foregoing regulation method, closed-loop proportional integral (PI) control is used in the WPT system to adjust a phase angle or a frequency. Specifically, in the phase angle regulation method, a magnitude of an actual output voltage $U_o$ on the secondary side is collected, then $U_o$ is transmitted to a primary-side controller by using a wireless communications module, the primary-side controller regulates a phase difference D between a lead leg and a lag leg of an inverter according to an error signal between the reference voltage $U_{ref}$ and the actual output voltage $U_o$ through PI control, so that the actual output voltage $U_o$ is stabilized near the reference voltage $U_{ref}$. In the frequency regulation method, a magnitude of an actual output voltage $U_o$ on the secondary side is collected, then $U_o$ is transmitted to a primary-side controller by using a wireless communications module, and the primary-side controller regulates a switching frequency f of a primary-side inverter according to an error signal between the reference voltage $U_{ref}$ and the actual output voltage $U_o$, so that the actual output voltage $U_o$ is stabilized near the reference voltage $U_{ref}$.

Figure 4:
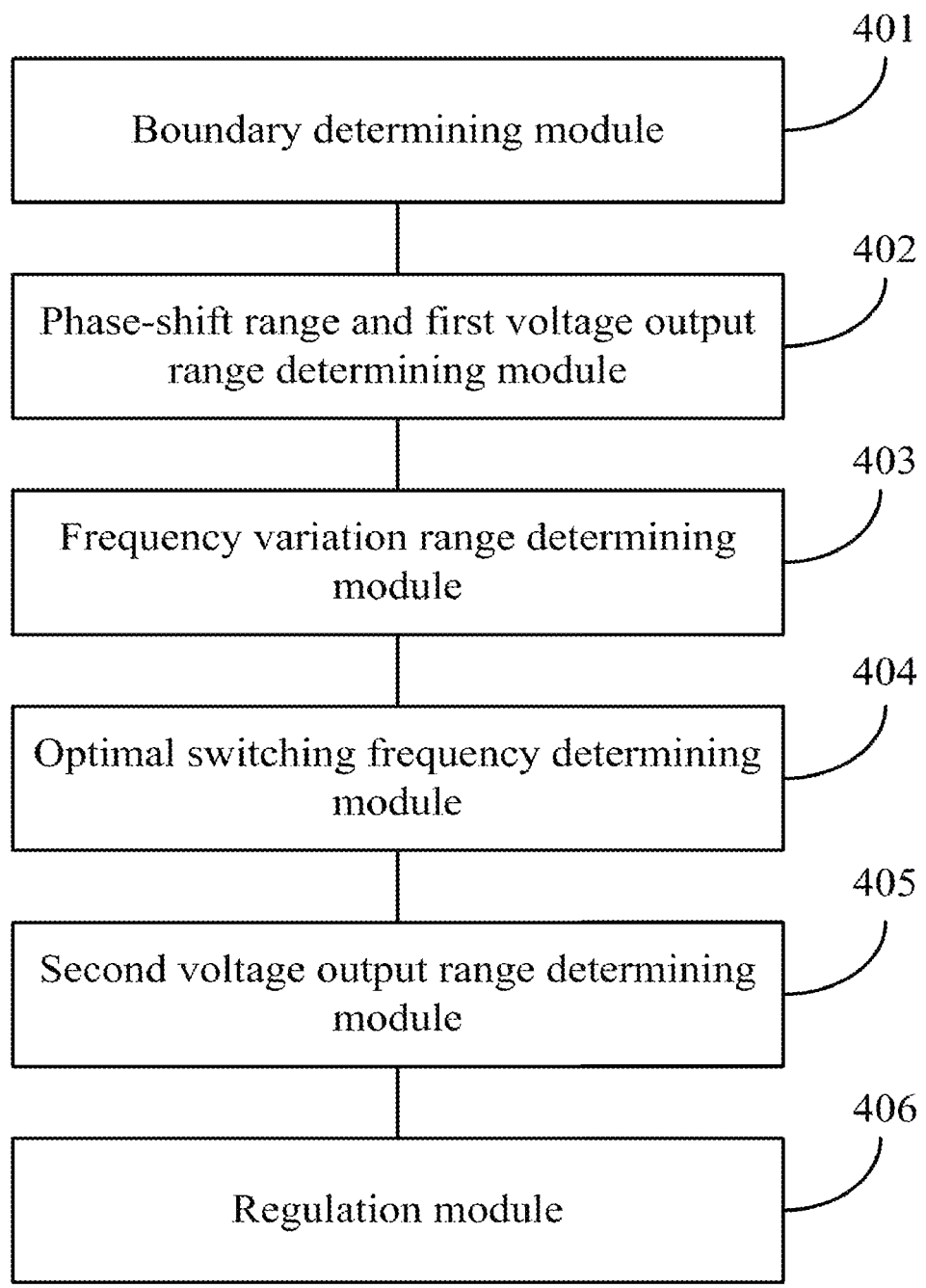
FIG. 4 is a schematic structural diagram of a WPT system regulation system for implementing ZVS in a wide power range according to the present disclosure.

FIG. 4 is a schematic structural diagram of a WPT system regulation system for implementing ZVS in a wide power range according to the present disclosure. As shown in FIG. 4, the WPT system regulation system for implementing ZVS in a wide power range in the present disclosure includes the following structures:

a boundary determining module 401 configured to determine, according to a topology structure of a WPT system and based on a linear state equation, a phase-shift angle boundary and a switching frequency boundary of an inverter that meet ZVS, where the WPT system is an LCC -LCC compensation topology structure;

a phase-shift range and first voltage output range determining module 402 configured to fix a switching frequency at a resonance frequency of the WPT system, and determine, in a phase -shift manner, a phase-shift range and a corresponding first voltage output range for implementing ZVS;

a frequency variation range determining module 403 configured to determine a frequency variation range of a frequency modulation method based on the resonance frequency of the WPT system;

an optimal switching frequency determining module 404 configured to determine an optimal switching frequency based on corresponding switching frequencies and phase-shift angles that meet ZVS at different expected output voltages of the WPT system;

a second voltage output range determining module 405 configured to determine, based on the phase-shift range for implementing ZVS, a second voltage output range for implementing ZVS at the optimal switching frequency; and a regulation module 406 configured to regulate the WPT system by using different regulation methods according to a relationship between a reference voltage of the WPT system and the first voltage output range and a relationship between the reference voltage and the second voltage output range, where the regulation methods include a first regulation method, a second regulation method, and a third regulation method; the first regulation method includes: fixing the switching frequency at the resonance frequency of the WPT system, and regulating the WPT system by using a phase-shift method; the second regulation method includes: fixing a phase angle at a maximum phase angle in the phase-shift range for implementing ZVS, and regulating the WPT system by using a frequency modulation method; and the third regulation method includes: fixing the switching frequency at the optimal switching frequency, and regulating the WPT system by using a phase-shift method.

In another embodiment, in the WPT system regulation system for implementing ZVS in a wide power range in the present disclosure, the boundary determining module 401 specifically includes:

a linear state equation construction unit configured to construct a linear state equation, where the linear state equation is $\dot{x}(t)=Ax(t)+Bu(t)$, where $\dot{x}(t)$ is a derivative of a state quantity $x(t)$; $x(t)=[i_{Lf1}(t)\ u_{Cf1}(t)\ i_1(t)\ u_{C1}(t)]^T$, where $i_{Lf1}(t)$ is a current through an inductor in a primary-side resonance compensation network, $u_{Cf1}(t)$ is a voltage at both ends of a parallel capacitor in the primary-side resonance compensation network, $i_1(t)$ is a current through a self-inductor of a transmit coil, and $u_{C1}(t)$ is a voltage at both ends of a series capacitor in the primary-side resonance compensation network; A is a system matrix and $$A = \begin{bmatrix} 0 & -\frac{1}{L_{f1}} & 0 & 0 \\ \frac{1}{C_{f1}} & 0 & -\frac{1}{C_{f1}} & 0 \\ 0 & \frac{1}{L_1+L_{req}} & -\frac{Re(Z_{ref})}{L_1+L_{req}} & -\frac{1}{L_1+L_{req}} \\ 0 & 0 & \frac{1}{C_1} & 0 \end{bmatrix},$$

where $C_{f1}$ is the parallel capacitor in the primary-side resonance compensation network, $L_{f1}$ is the inductor in the primary-side resonance compensation network, $L_1$ is the self-inductor of the transmit coil, $L_{req}$ is an equivalent inductor, $C_1$ is the series capacitor in the primary-side resonance compensation network, $Re(Z_{ref})$ is a real part of an impedance $Z_{ref}$ mapped from a secondary side to a primary side, and $Re(Z_{ref})$ is related to a switching frequency; B is a control matrix and $$B = \begin{bmatrix} \frac{1}{L_{f1}} & 0 & 0 & 0 \end{bmatrix}^T;$$

and $u(\Delta)$ is an output voltage of a primary-side inverter, $u(\Delta_0)=U_{dc}$, $u(\Delta_1)=0$, $u(\Delta_2)=-U_{dc}$, and $u(\Delta_3)=0$, where $U_{dc}$ is a primary-side DC input voltage, $\Delta_0$ represents a time period $t_0$~$t_1$, $\Delta_1$ represents a time period $t_1$~$t_2$, $\Delta_2$ represents a time period $t_2$~$t_3$, and $\Delta_3$ represents a time period $t_3$~$t_4$, where $\Delta_0$, $\Delta_1$, $\Delta_2$, and $\Delta_3$ are related to phase-shift angles;

a state quantity solving unit configured to solve the linear state equation by using a numerical method and a formula $$\begin{bmatrix} -e^{A\Delta_0} & I & 0 & 0 \\ 0 & -e^{A\Delta_1} & I & 0 \\ 0 & 0 & -e^{A\Delta_2} & I \\ I & 0 & 0 & -e^{A\Delta_3} \end{bmatrix} \begin{bmatrix} x(t_0) \\ x(t_1) \\ x(t_2) \\ x(t_3) \end{bmatrix} = \begin{bmatrix} A^{-1}(e^{A\Delta_0}-I)BU_{dc} \\ 0 \\ -A^{-1}(e^{A\Delta_2}-I)BU_{dc} \\ 0 \end{bmatrix}$$

according to a symmetry of waveforms of an output voltage and an output current of an inverter in a steady state, to obtain a state quantity at each switching moment, where the switching moments include a moment $t_0$, a moment $t_1$, a moment $t_2$, and a moment $t_3$, where $x(t_0)$ is a state quantity at the moment $t_0$, $x(t_1)$ is a state quantity at the moment $t_1$, $x(t_2)$ is a state quantity at the moment $t_2$, and $x(t_3)$ is a state quantity at the moment $t_3$; and a boundary determining unit configured to determine a phase-shift angle boundary and a switching frequency boundary of an inverter according to a condition for meeting ZVS, where the condition for meeting ZVS is $$\begin{cases} i_{Lf1}(t_0) < 0 \\ i_{Lf1}(t_1) > 0 \\ i_{Lf1}(t_2) > 0 \\ i_{Lf1}(t_3) < 0 \end{cases},$$

namely, $i_{Lf1\_min} = \min\{-i_{Lf1}(t_0), i_{Lf1}(t_1), i_{Lf1}(t_2), -i_{Lf1}(t_3)\} > 0$, where $i_{Lf1\_min}$ is a minimum absolute value of a current of the inductor in the primary-side resonance compensation network, $i_{Lf1}(t_0)$ is a current through the inductor in the primary-side resonance compensation network at the moment $t_0$, $i_{Lf1}(t_1)$ a current through the inductor in the primary-side resonance compensation network at the moment $t_1$, $i_{Lf1}(t_2)$ is a current through the inductor in the primary-side resonance compensation network at the moment $t_2$, and $i_{Lf1}(t_3)$ is a current through the inductor in the primary-side resonance compensation network at the moment $t_3$.

In another embodiment, in the WPT system regulation system for implementing ZVS in a wide power range in the present disclosure, the frequency variation range determining module 403 specifically includes:

a first curve plotting unit configured to plot, in a resonance frequency range based on the resonance frequency of the WPT system, a curve of a system output voltage varying with a switching frequency; and a frequency variation range determining unit configured to determine a switching frequency band corresponding to a monotonously varying curved segment in the curve as the frequency variation range of the frequency modulation method.

In another embodiment, in the WPT system regulation system for implementing ZVS in a wide power range in the present disclosure, the optimal switching frequency determining module 404 specifically includes:

a phase-shift angle calculation unit configured to: for each expected output voltage of the WPT system, calculate, by using a Kirchhoff's voltage law, a phase-shift angle corresponding to each frequency that meets the expected output voltage in the frequency variation range of the frequency modulation method;

a second curve plotting unit configured to determine a curve, corresponding to each expected output voltage, of the minimum absolute value that is of the current of the inductor in the primary-side resonance compensation network and that varies with a frequency; and an optimal switching frequency determining unit configured to determine an optimal switching frequency according to curves corresponding to all expected output voltages, where at the optimal switching frequency in all frequencies, a maximum quantity of minimum absolute values that are of the current of the inductor in the primary-side resonance compensation network and that are greater than 0 is obtained.

In another embodiment, in the WPT system regulation system for implementing ZVS in a wide power range in the present disclosure, the regulation module 406 specifically includes:

a first regulation unit configured to: when the reference voltage of the WPT system is in a range $[U_p, U_{max}]$, regulate the WPT system by using the first regulation method;

a second regulation unit configured to: when the reference voltage of the WPT system is in a range $[U_H, U_P]$, regulate the WPT system by using the second regulation method; and a third Iv u 1 regulation unit configured to: when the reference voltage of the WPT system is in a range $[U_L, U_H]$, regulate the WPT system by using the third regulation method, where the first regulation unit is further configured to: when the reference voltage of the WPT system is in a range $(0, U_L)$ or $(U_{max}, \infty)$, regulate the WPT system by using the first regulation method, where the first voltage output range is $[U_p, U_{max}]$, and the second voltage output range is $[U_L, U_H]$.

In the present disclosure, a boundary condition for implementing soft switching of an inverter is calculated, a relationship between an output voltage and a switching frequency variation is analyzed, and an optimal operating frequency for implementing ZVS in a phase-shift method is determined according to three constraint conditions: (1) A switching frequency variation range is as close to a resonance frequency as possible; (2) An output voltage varies monotonously with a frequency in the frequency variation range; (3) ZVS is implemented in a wide output voltage range as much as possible. The determined frequency variation range is a frequency variation range in the frequency modulation method. Different control manners are reasonably selected according to different reference voltages, to implement a soft switching operation of the inverter as much as possible during output in a constant voltage. In addition, a conventional phase shift manner is also added in the control manner, so that a switching frequency of the inverter is as close to a resonance frequency as possible, to reduce system reactive power and improve system efficiency.

With reference to the prior art, the following further describes beneficial effects brought by the present disclosure.

Prior art 1: Variable-angle phase-shift control method for optimization efficiency of WPT of electric vehicle Patent CN110758132A designs a variable-angle phase-shift control method for optimization efficiency of WPT of AN electric vehicle, including the following steps: Controlling a power transfer voltage/power transfer current of a secondary active rectifier by using a power transfer voltage/power transfer current loop, controlling a ZVS phase angle of the secondary active rectifier by using a ZVS phase loop, and automatically searching for an operating point for optimal power transfer efficiency by using a disturbance observation method. In this method, ZVS of the inverter and the rectifier can be implemented while a stable power transfer voltage/power transfer current is maintained.

In the prior art 1, the ZVS phase angle of the secondary active rectifier is controlled by using the ZVS phase loop for a bilateral active rectifier, and this control method is complex and is not suitable for control of other topology circuits. The solution of the present disclosure can resolve the problem in the prior art 1.

Prior art 2: Soft switching control method and apparatus for inverter

Patent CN110784118A designs a soft switching control method and apparatus for an inverter in a WPT system. In the method, a load current is collected in the WPT system, a phase-shift angle of a drive waveform is calculated according to the load current, and the drive waveform is sent to a power switching device of an inverter according to the determined phase-shift angle, to control the power switching device. In the present disclosure, if a drive waveform duty cycle is not changed, a phase shift angle of the drive waveform can be determined by collecting a load current, to implement a soft-switching operating state in different load cases, thereby avoiding a problem that a power switching device is damaged by a hard-switching state generated by changing the drive waveform duty cycle.

In the prior art 2, an initial phase of a voltage and an initial phase of a current need to be compared to determine whether a voltage waveform is a lead current waveform. In practice, phase detection of a high-frequency signal is difficult. Therefore, an actual implementation situation is not considered in this solution. In addition, only a ZVS operating state is considered, and a regulation capability and a regulation range of an output power are not considered. The solution of the present disclosure can resolve the problem in the prior art 2.

Prior art 3: Soft switching converter

Patent CN109510501A designs a soft switching converter. In an existing full-bridge switching circuit, two switches and one inductor are added, and a switching control unit transmits a pulse signal to a controllable switch by using a pulse width modulation technology. In this patent, an operating process of the soft switching converter is analyzed, and a magnitude of a compensation current is determined.

Compared with an existing full-bridge switch circuiting, two switches and one inductor are added in the prior art 3. Therefore, it is more difficult to design and control, and the losses caused by the additional devices are not considered. The solution of the present disclosure can resolve the problem in the prior art 3.

Prior art 4: Soft switching high-efficiency WPT method based on bilateral phase shifting and frequency modulation Patent CN109823206A designs a soft switching high-efficiency WPT method based on bilateral phase shifting and frequency modulation. In this solution, a direct current side of a sending end converter and a direct current side of a receiving end converter of a WPT system are each connected with a soft switching auxiliary branch circuit. By controlling on and off of an auxiliary switching tube and resonating a voltage of a bridge leg into zero before the switching tube is switched on, zero-voltage turning-on of all sending end switching devices and receiving end switching devices is realized.

In the prior art 4, the auxiliary circuit is required, thereby increasing circuit complexity and costs. In addition, a phase detector is added in a control system in this solution, and phase collection needs to be performed on a secondary current, which increases control difficulty. The solution of the present disclosure can resolve the problem in the prior art 4.

Prior art 5: Phase-shift and full-bridge switching inverter circuit

Patent CN108054947A designs a phase-shift and full-bridge soft-switching inverter circuit for WPT, belonging to the technical field of zero-voltage and zero-current switching full-bridge PWM DC-AC conversion, including four fully-controlled switching devices, buffer inductors connected in series with the switching devices, buffer capacitors connected in parallel with the switching devices, and a diode that blocks a reverse current.

In the prior art 5, additional devices need to be added, and costs are high. In addition, not all switches are in a ZVS state, and impact of a change of a phase shift angle on ZVS in actual application is not considered. The solution of the present disclosure can resolve the problem in the prior art 5.

Each example of the present specification is described in a progressive manner, each example focuses on the difference from other examples, and the same and similar parts between the examples may refer to each other.

In this specification, some specific embodiments are used for illustration of the principles and implementations of the present disclosure. The description of the foregoing embodiments is used to help illustrate the method of the present disclosure and the core ideas thereof In addition, persons of ordinary skill in the art can make various modifications in terms of specific implementations and the scope of application in accordance with the ideas of the present disclosure.

In conclusion, the content of the present description shall not be construed as limitations to the present disclosure.

What is claimed is:

1. A wireless power transfer (WPT) system regulation method for implementing zero voltage switching (ZVS) in a wide power range, comprising:
   determining, according to a topology structure of a WPT system and based on a linear state equation, a phase-shift angle boundary and a switching frequency boundary of an inverter that meet ZVS, wherein the WPT system is an LCC-LCC compensation topology structure;
   fixing a switching frequency at a resonance frequency of the WPT system, and determining, in a phase-shift manner, a phase-shift range and a corresponding first voltage output range for implementing ZVS;
   determining a frequency variation range of a frequency modulation method based on the resonance frequency of the WPT system;
   determining an optimal switching frequency based on corresponding switching frequencies and phase-shift angles that meet ZVS at different expected output voltages of the WPT system;
   determining, based on the phase-shift range for implementing ZVS, a second voltage output range for implementing ZVS at the optimal switching frequency; and
   regulating the WPT system by using different regulation methods according to a relationship between a reference voltage of the WPT system and the first voltage output range and a relationship between the reference voltage and the second voltage output range, wherein the regulation methods comprise a first regulation method, a second regulation method, and a third regulation method,
   wherein the first regulation method comprises fixing the switching frequency at the resonance frequency of the WPT system, and regulating the WPT system by using a phase-shift method,
   wherein the second regulation method comprises fixing a phase angle at a maximum phase angle in the phase-shift range for implementing ZVS, and regulating the WPT system by using a frequency modulation method,
   wherein the third regulation method comprises fixing the switching frequency at the optimal switching frequency, and regulating the WPT system by using a phase-shift method, and
   wherein when the reference voltage of the WPT system is in a range $[U_p, U_{max}]$, regulating the WPT system by using the first regulation method; when the reference voltage of the WPT system is in a range $[U_H, U_P]$, regulating the WPT system by using the second regulation method; when the reference voltage of the WPT system is in a range $[U_L, U_H]$, regulating the WPT system by using the third regulation method; and when the reference voltage of the WPT system is in a $(0, U_L)$ or $(U_{max}, \infty)$, , regulating the WPT system by using the first regulation method, wherein the first voltage output range is $[U_p, U_{max}]$, and the second voltage output range is $[U_L, U_H]$.

2. The WPT system regulation method for implementing ZVS in a wide power range according to claim 1, wherein the determining, according to a topology structure of a WPT system and based on a linear state equation, a phase-shift angle boundary and a switching frequency boundary of an inverter that meet ZVS specifically comprises:
   constructing a linear state equation, wherein the linear state equation is $\dot{x}(t)=Ax(t)+Bu(t)$, wherein $\dot{x}(t)$ is a derivative of a state quantity x(t), x(t)=[$i_{Lf1}$(t) $u_{Cf1}$(t) $i_1$(t) $u_{C1}$(t)]$^T$, wherein $i_{Lf1}$(t) is a current through an inductor in a primary-side resonance compensation network, $u_{Cf1}$(t) is a voltage at both ends of a parallel capacitor in the primary-side resonance compensation network, $i_1$(t) is a current through a self-inductor of a transmit coil, and $u_{C1}$(t) is a voltage at both ends of a series capacitor in the primary-side resonance compensation network, wherein A is a system matrix and $$A = \begin{bmatrix} 0 & -\frac{1}{L_{f1}} & 0 & 0 \\ \frac{1}{C_{f1}} & 0 & -\frac{1}{C_{f1}} & 0 \\ 0 & \frac{1}{L_1+L_{req}} & -\frac{Re(Z_{ref})}{L_1+L_{req}} & -\frac{1}{L_1+L_{req}} \\ 0 & 0 & \frac{1}{C_1} & 0 \end{bmatrix},$$

wherein $C_{f1}$ is the parallel capacitor in the primary-side resonance compensation network, $L_{f1}$ is the inductor in the primary-side resonance compensation network, $L_1$ is the self-inductor of the transmit coil, $L_{req}$ is an equivalent inductor, $C_1$ is the series capacitor in the primary-side resonance compensation network, $Re(Z_{ref})$ is a real part of an impedance $Z_{ref}$ mapped from a secondary side to a primary side, and $Re(Z_{ref})$ is related to a switching frequency, wherein B is a control matrix and $$B = \begin{bmatrix} \frac{1}{L_{f1}} & 0 & 0 & 0 \end{bmatrix}^T;$$

and u(Δ) is an output voltage of a primary-side inverter, u($\Delta_0$)=$U_{dc}$, u($\Delta_1$)=0, u($\Delta_2$)=−$U_{dc}$, and u($\Delta_3$)=0, where $U_{dc}$ is a primary-side DC input voltage, $\Delta_0$ represents a time period $t_0$~$t_1$, $\Delta_1$ represents a time period $t_1$~$t_2$, $\Delta_2$ represents a time period $t_2$~$t_3$, and $\Delta_3$ represents a time period $t_3$~$t_4$, where $\Delta_0$, $\Delta_1$, $\Delta_2$, and $\Delta_3$ are related to phase-shift angles;

solving the linear state equation by using a numerical method and a formula $$\begin{bmatrix} -e^{A\Delta_0} & I & 0 & 0 \\ 0 & -e^{A\Delta_1} & I & 0 \\ 0 & 0 & -e^{A\Delta_2} & I \\ I & 0 & 0 & -e^{A\Delta_3} \end{bmatrix} \begin{bmatrix} x(t_0) \\ x(t_1) \\ x(t_2) \\ x(t_3) \end{bmatrix} = \begin{bmatrix} A^{-1}(e^{A\Delta_0}-I)BU_{dc} \\ 0 \\ -A^{-1}(e^{A\Delta_2}-I)BU_{dc} \\ 0 \end{bmatrix}$$

according to a symmetry of waveforms of an output voltage and an output current of an inverter in a steady state, to obtain a state quantity at each switching moment, wherein the switching moments comprise a moment $t_0$, a moment $t_1$, a moment $t_2$, and a moment $t_3$, wherein x($t_0$) is a state quantity at the moment $t_0$, x($t_1$) is a state quantity at the moment $t_1$, x($t_2$) is a state quantity at the moment $t_2$, and x($t_3$) is a state quantity at the moment $t_3$; and determining a phase-shift angle boundary and a switching frequency boundary of an inverter according to a condition for meeting ZVS, wherein the condition for meeting ZVS is $$\begin{cases} i_{Lf1}(t_0) < 0 \\ i_{Lf1}(t_1) > 0 \\ i_{Lf1}(t_2) > 0 \\ i_{Lf1}(t_3) < 0 \end{cases},$$

namely, $i_{Lf1}$_min=min{−$i_{Lf1}$($t_0$), $i_{Lf1}$($t_1$), $i_{Lf1}$($t_2$), −$i_{Lf1}$($t_3$)}>0, where $i_{Lf1}$_min is a minimum absolute value of a current of the inductor in the primary-side resonance compensation network, $i_{Lf1}$($t_0$) is a current through the inductor in the primary-side resonance compensation network at the moment $t_0$, $i_{Lf1}$($t_1$) is a current through the inductor in the primary-side resonance compensation network at the moment $t_1$, $i_{Lf1}$($t_2$) is a current through the inductor in the primary-side resonance compensation network at the moment $t_2$, and $i_{Lf1}$($t_3$) is a current through the inductor in the primary-side resonance compensation network at the moment $t_3$.

3. The WPT system regulation method for implementing ZVS in a wide power range according to claim 2, wherein the determining an optimal switching frequency based on corresponding switching frequencies and phase-shift angles that meet ZVS at different expected output voltages of the WPT system specifically comprises:

for each expected output voltage of the WPT system, calculating, by using a Kirchhoff's voltage law, a phase-shift angle corresponding to each frequency that meets the expected output voltage in the frequency variation range of the frequency modulation method;

determining a curve, corresponding to each expected output voltage, of the minimum absolute value that is of the current of the inductor in the primary-side resonance compensation network and that varies with a frequency; and determining an optimal switching frequency according to curves corresponding to all expected output voltages, wherein at the optimal switching frequency in all frequencies, a maximum quantity of minimum absolute values that are of the current of the inductor in the primary-side resonance compensation network and that are greater than 0 is obtained.

4. The WPT system regulation method for implementing ZVS in a wide power range according to claim 1, wherein the determining a frequency variation range of a frequency modulation method based on the resonance frequency of the WPT system specifically comprises:

plotting, in a resonance frequency range based on the resonance frequency of the WPT system, a curve of a system output voltage varying with a switching frequency; and determining a switching frequency band corresponding to a monotonously varying curved segment in the curve as the frequency variation range of the frequency modulation method.

5. A WPT system regulation system for implementing ZVS in a wide power range, comprising:

a boundary determining module configured to determine, according to a topology structure of a WPT system and based on a linear state equation, a phase-shift angle boundary and a switching frequency boundary of an inverter that meet ZVS, wherein the WPT system is an LCC-LCC compensation topology structure;

a phase-shift range and first voltage output range determining module configured to fix a switching frequency at a resonance frequency of the WPT system, and determine, in a phase-shift manner, a phase-shift range and a corresponding first voltage output range for implementing ZVS;

a frequency variation range determining module configured to determine a frequency variation range of a frequency modulation method based on the resonance frequency of the WPT system;

an optimal switching frequency determining module configured to determine an optimal switching frequency based on corresponding switching frequencies and phase-shift angles that meet ZVS at different expected output voltages of the WPT system;

a second voltage output range determining module configured to determine, based on the phase-shift range for implementing ZVS, a second voltage output range for implementing ZVS at the optimal switching frequency; and a regulation module configured to regulate the WPT system by using different regulation methods according to a relationship between a reference voltage of the WPT system and the first voltage output range and a relationship between the reference voltage and the second voltage output range, wherein the regulation methods comprise a first regulation method, a second regulation method, and a third regulation method; the first regulation method comprises: fixing the switching frequency at the resonance frequency of the WPT system, and regulating the WPT system by using a phase-shift method; the second regulation method comprises: fixing a phase angle at a maximum phase angle in the phase-shift range for implementing ZVS, and regulating the WPT system by using a frequency modulation method; and the third regulation method comprises: fixing the switching frequency at the optimal switching frequency, and regulating the WPT system by using a phase-shift method, wherein when the reference voltage of the WPT system is in a range $[U_p, U_{max}]$, regulating the WPT system by using the first regulation method, wherein when the reference voltage of the WPT system is in a range $[U_H, U_P]$, regulating the WPT system by using the second regulation method, wherein when the reference voltage of the WPT system is in a range $[U_L, U_H]$, regulating the WPT system by using the third regulation method, and wherein when the reference voltage of the WPT system is in a range $(0, U_L)$ or $(U_{max}, \infty)$, regulating the WPT system by using the first regulation method, wherein the first voltage output range is $[U_p, U_{max}]$, and the second voltage output range is $[U_L, U_H]$.

6. The WPT system regulation system for implementing ZVS in a wide power range according to claim 5, wherein the boundary determining module specifically comprises:

a linear state equation construction unit configured to construct a linear state equation, wherein the linear state equation is $\dot{x}(t)=Ax(t)+Bu(t)$, wherein $\dot{x}(t)$ is a derivative of a state quantity $x(t)$, $x(t)=[i_{Lf1}(t)\ u_{Cf1}(t)\ i_1(t)\ u_{C1}(t)]^T$, wherein $i_{Lf1}(t)$ is a current through an inductor in a primary-side resonance compensation network, $u_{Cf1}(t)$ is a voltage at both ends of a parallel capacitor in the primary-side resonance compensation network, $i_1(t)$ is a current through a self-inductor of a transmit coil, and $u_{C1}(t)$ is a voltage at both ends of a series capacitor in the primary-side resonance compensation network, $$A = \begin{bmatrix} 0 & -\frac{1}{L_{f1}} & 0 & 0 \\ \frac{1}{C_{f1}} & 0 & -\frac{1}{C_{f1}} & 0 \\ 0 & \frac{1}{L_1+L_{req}} & -\frac{Re(Z_{ref})}{L_1+L_{req}} & -\frac{1}{L_1+L_{req}} \\ 0 & 0 & \frac{1}{C_1} & 0 \end{bmatrix},$$

wherein $C_{f1}$ is the parallel capacitor in the primary-side resonance compensation network, $L_{f1}$ is the inductor in the primary-side resonance compensation network, $L_1$ is the self-inductor of the transmit coil, $L_{req}$ is an equivalent inductor, $C_1$ is the series capacitor in the primary-side resonance compensation network, $Re(Z_{ref})$ is a real part of an impedance $Z_{ref}$ mapped from a secondary side to a primary side, and $Re(Z_{ref})$ is related to a switching frequency, wherein B is a control matrix and $$B = \begin{bmatrix} \frac{1}{L_{f1}} & 0 & 0 & 0 \end{bmatrix}^T,$$

and $u(\Delta)$ is an output voltage of a primary-side inverter, $u(\Delta_0)=U_{dc}$, $u(\Delta_1)=0$, $u(\Delta_2)=-U_{dc}$, and $u(\Delta_3)=0$, where $U_{dc}$ is a primary-side DC input voltage, $\Delta_0$ represents a time period $t_0$~$t_1$, $\Delta_1$ represents a time period $t_1$~$t_2$, $\Delta_2$ represents a time period $t_2$~$t_3$, and $\Delta_3$ represents a time period $t_3$~$t_4$, where $\Delta_0$, $\Delta_1$, $\Delta_2$, and $\Delta_3$ are related to phase-shift angles a state quantity solving unit configured to solve the linear state equation by using a numerical method and a formula $$\begin{bmatrix} -e^{A\Delta_0} & I & 0 & 0 \\ 0 & -e^{A\Delta_1} & I & 0 \\ 0 & 0 & -e^{A\Delta_2} & I \\ I & 0 & 0 & -e^{A\Delta_3} \end{bmatrix} \begin{bmatrix} x(t_0) \\ x(t_1) \\ x(t_2) \\ x(t_3) \end{bmatrix} = \begin{bmatrix} A^{-1}(e^{A\Delta_0}-I)BU_{dc} \\ 0 \\ -A^{-1}(e^{A\Delta_2}-I)BU_{dc} \\ 0 \end{bmatrix}$$

according to a symmetry of waveforms of an output voltage and an output current of an inverter in a steady state, to obtain a state quantity at each switching moment, wherein the switching moments comprise a moment $t_0$, a moment $t_1$, a moment $t_2$, and a moment $t_3$, wherein $x(t_0)$ is a state quantity at the moment $t_0$, $x(t_1)$ is a state quantity at the moment $t_1$, $x(t_2)$ is a state quantity at the moment $t_2$, and $x(t_3)$ is a state quantity at the moment $t_3$; and a boundary determining unit configured to determine a phase-shift angle boundary and a switching frequency boundary of an inverter according to a condition for meeting ZVS, wherein the condition for meeting ZVS is $$\begin{cases} i_{Lf1}(t_0) < 0 \\ i_{Lf1}(t_1) > 0 \\ i_{Lf1}(t_2) > 0 \\ i_{Lf1}(t_3) < 0 \end{cases},$$

namely, $i_{Lf1\_min} = \min\{-i_{Lf1}(t_0), i_{Lf1}(t_1), i_{Lf1}(t_2), -i_{Lf1}(t_3)\} > 0$, where $i_{Lf1\_min}$ is a minimum absolute value of a current of the inductor in the primary-side resonance compensation network, $i_{Lf1}(t_0)$ is a current through the inductor in the primary-side resonance compensation network at the moment $t_0$, $i_{Lf1}(t_1)$ is a current through the inductor in the primary-side resonance compensation network at the moment $t_1$, $i_{Lf1}(t_2)$ is a current through the inductor in the primary-side resonance compensation network at the moment $t_2$, and $i_{Lf1}(t_3)$ is a current through the inductor in the primary-side resonance compensation network at the moment $t_3$.

7. The WPT system regulation system for implementing ZVS in a wide power range according to claim 6, wherein the optimal switching frequency determining module specifically comprises:
   a phase-shift angle calculation unit configured to: for each expected output voltage of the WPT system, calculate, by using a Kirchhoff's voltage law, a phase-shift angle corresponding to each frequency that meets the expected output voltage in the frequency variation range of the frequency modulation method;
   a second curve plotting unit configured to determine a curve, corresponding to each expected output voltage, of the minimum absolute value that is of the current of the inductor in the primary-side resonance compensation network and that varies with a frequency; and
   an optimal switching frequency determining unit configured to determine an optimal switching frequency according to curves corresponding to all expected output voltages, wherein at the optimal switching frequency in all frequencies, a maximum quantity of minimum absolute values that are of the current of the inductor in the primary-side resonance compensation network and that are greater than 0 is obtained.

8. The WPT system regulation system for implementing ZVS in a wide power range according to claim 5, wherein the frequency variation range determining module specifically comprises:
   a first curve plotting unit configured to plot, in a resonance frequency range based on the resonance frequency of the WPT system, a curve of a system output voltage varying with a switching frequency; and
   a frequency variation range determining unit configured to determine a switching frequency band corresponding to a monotonously varying curved segment in the curve as the frequency variation range of the frequency modulation method.

* * * * *